United States Patent
Sou

(10) Patent No.: US 10,403,048 B2
(45) Date of Patent: Sep. 3, 2019

(54) STORAGE MEDIUM, CONTENT PROVIDING APPARATUS, AND CONTROL METHOD FOR PROVIDING STEREOSCOPIC CONTENT BASED ON VIEWING PROGRESSION

(71) Applicant: SQUARE ENIX CO., LTD., Tokyo (JP)

(72) Inventor: Kaei Sou, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 10 days.

(21) Appl. No.: 15/909,224

(22) Filed: Mar. 1, 2018

(65) Prior Publication Data

US 2018/0190037 A1 Jul. 5, 2018

Related U.S. Application Data

(63) Continuation of application No. PCT/JP2015/075259, filed on Sep. 4, 2015.

(51) Int. Cl.
*G06T 19/00* (2011.01)
*G06F 3/01* (2006.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
CPC .............. G06T 19/006; G02B 27/0172; G02B 2027/014; G06F 3/012; G06F 3/0483; G06F 3/011; G06F 3/048
(Continued)

(56) References Cited

U.S. PATENT DOCUMENTS

2013/0307855 A1* 11/2013 Lamb ................... G02B 27/225 345/473
2013/0321390 A1 12/2013 Latta et al.
(Continued)

FOREIGN PATENT DOCUMENTS

| JP | 09-319556 | 12/1997 |
|---|---|---|
| JP | 3993423 | 10/2007 |

OTHER PUBLICATIONS

"Modern Polaxis—Augmented Reality Comic Book and App" by Sutu; Aug. 3, 2014; (https://www.kickstarter.com/projects/138189330/modern-polaxis-augmented-reality-comic-book-and-ap) (https://web.archive.org/web/20140803122526/https://www.kickstarter.com/projects/138189330/modern-polaxis-augmented-reality-comic-book-and-ap#expan).*

"Marvel reveals augmented reality for comic books, new 'Infinite' digital comics," Dante D'Orazio; www.theverge.com, Mar. 11, 2012. (https://www.theverge.com/2012/3/11/2862606/marvel-ar-infinite-augmented-reality-comic-book) (https://web.archive.org/web/20120623085153/http://www.theverge.com/users/dantedorazio).*

(Continued)

*Primary Examiner* — King Y Poon
*Assistant Examiner* — Vincent Peren
(74) *Attorney, Agent, or Firm* — Greenblum & Bernstein, P.L.C.

(57) ABSTRACT

A computer is caused to execute processing that detects that viewing is being performed for a book that is provided for reading on which details corresponding to a predetermined story are printed and that is registered in advance; processing that, for a target book for which it is detected that viewing is being performed, identifies a progression position in the viewing in a story corresponding to the book; and processing that starts presentation of binocular stereoscopic content associated with the progression position in the viewing that is identified.

13 Claims, 8 Drawing Sheets

(51) Int. Cl.
  *G06K 9/00*    (2006.01)
  *G02B 27/01*   (2006.01)
  *G06F 3/048*   (2013.01)
  *G06F 3/0483*  (2013.01)

(52) U.S. Cl.
  CPC .............. *G06F 3/012* (2013.01); *G06F 3/048* (2013.01); *G06F 3/0483* (2013.01); *G06K 9/00033* (2013.01); *G02B 2027/014* (2013.01)

(58) Field of Classification Search
  USPC ........................................................ 345/633
  See application file for complete search history.

(56) References Cited

U.S. PATENT DOCUMENTS

| | | |
|---|---|---|
| 2014/0002491 A1 | 1/2014 | Lamb et al. |
| 2015/0097767 A1* | 4/2015 | Park .................. G06T 15/20 345/156 |

OTHER PUBLICATIONS

Rekimoto, "Fusion of the Digital and the Physical User Interface Deployed into Real World", Documents of 34th Special Internet Group on Foundation of Artificial Intelligence (SIG-FAI-9802), Sep. 24, 1998, pp. 1 to 7.

Takeda et al., "Virtual Pop-Up Book using Augmented Reality Technology", Transactions of the Virtual Reality Society of Japan, Dec. 31, 2007, pp. 595 to 601.

International Search Report (ISR) from International Searching Authority (Japan Patent Office) in International Pat. Appl. No. PCT/JP2015/075259, dated Nov. 2, 2015.

Office Action from Japan Patent Office (JPO) in Japanese Patent Appl. No. 2015-546759, dated May 27, 2016, together with a partial English language translation.

Extended European Search Report dated Mar. 15, 2019 issued in European Patent Application No. 15903071.7.

* cited by examiner

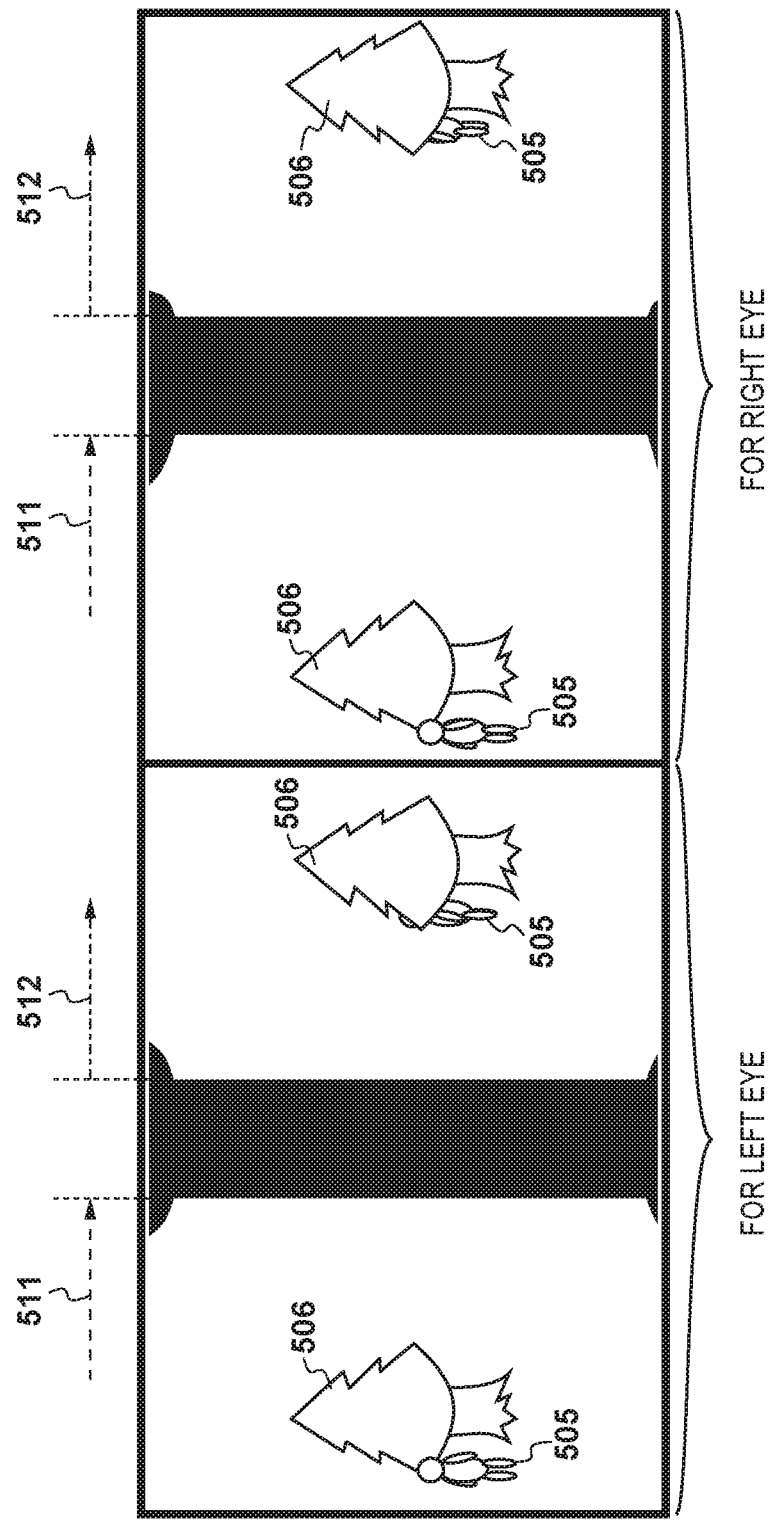

STORAGE MEDIUM, CONTENT PROVIDING APPARATUS, AND CONTROL METHOD FOR PROVIDING STEREOSCOPIC CONTENT BASED ON VIEWING PROGRESSION

This application is a continuation of International Patent Application No. PCT/JP2015/075259 filed on Sep. 4, 2015, the entire content of which is incorporated herein by reference.

TECHNICAL FIELD

The present invention relates to a storage medium, a content providing apparatus, and a control method, and in particular relates to a technique that makes a user experience of binocular stereoscopic contents possible.

BACKGROUND ART

In recent years, in accompaniment of miniaturization of display apparatuses such as LCDs, increasing resolutions (improvements in pixel density), and the spread of information processing apparatuses having calculation capabilities by which real-time rendering of high definition graphics can be implemented, the use of display apparatuses capable of providing binocular stereoscopic content such as HMDs has come to be realistic.

HMDs are broadly divided in to so-called see-through HMDs that capture visual information of the outside world by a camera or the like and present content superimposed on the obtained images, and non-see-through HMDs in which the information that is presented is all independent of visual information of the outside world. PTL1 discloses a presentation method that allows a user to view electronic publications by presenting, through a see-through HMD, desired electronic publications superimposed on a dedicated book for viewing electronic publications on which markers are added.

CITATION LIST

Patent Literature

PTL1: Japanese Patent No. 3993423

SUMMARY OF INVENTION

Technical Problem

Incidentally, configurations that, for the first time, enabled a user to view electronic publications by wearing a see-through HMD, as in PTL1, were cumbersome for the user. For example, while normally a user could pick up a book made of paper media and view (read) the book by turning the pages, the user of the book for viewing electronic publications of PTL1 could only observe the markers. Specifically, the book for viewing electronic publications of PTL1 cannot be provided for reading without wearing the HMD, and so the reading experience of the user was restricted.

In particular, in the presentation method of PTL1, there was the possibility that reading while wearing the HMD would not be attractive to the user since the images that are displayed superimposed on the book for viewing electronic publications are only images of pages that configure the electronic publication.

At least one embodiment of the present invention was made in view of the foregoing problem, and an object thereof is to provide a program, a storage medium, a content providing apparatus, and a control method that provides an additional user experience when a user views a book provided for reading.

Solution to Problem

In order to achieve the previously described object, a non-transitory computer readable storage medium which stores a program for causing a computer to execute: processing that detects that viewing is being performed for a book that is provided for reading on which details corresponding to a predetermined story are printed and that is registered in advance; processing that, for a target book for which it is detected that viewing is being performed, identifies a progression position in the viewing in a story corresponding to the book; and processing that starts presentation of binocular stereoscopic content associated with the progression position in the viewing that is identified.

Advantageous Effects of Invention

By such a configuration, according to at least one embodiment of the present invention, it becomes possible to provide an additional user experience when a user views a book provided for reading.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated into and constitute a part of the specification, illustrate embodiments of the invention and, together with the description, serve to explain the principles of the invention.

FIG. 5A, FIG. 5B, FIG. 5C, and FIG. 5D are views for explaining an example of a configuration of binocular stereoscopic content according to the embodiment of the present invention.

DESCRIPTION OF THE EMBODIMENTS

[Embodiment]

An exemplary embodiment of the present invention will be explained hereinafter in detail, with reference to the drawings. Note that in the one embodiment explained below, an example that applies the present invention to a content provision system that includes a content providing apparatus that provides binocular stereoscopic content to a user when the user views a book provided for reading, as an example of a content providing apparatus, will be explained. However, the present invention can be applied to any device that can provide binocular stereoscopic content to a user when the user views a book provided for reading.

<Configuration of Content Provision System>

Figure 1:
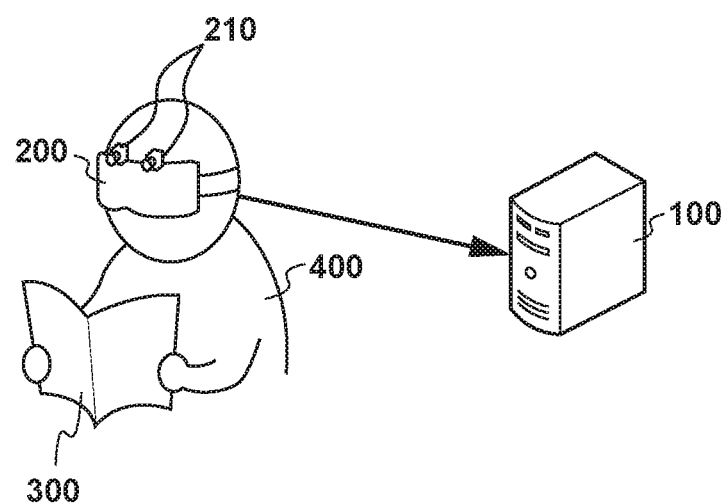
FIG. 1 is a view that illustrates an example of a configuration of a content provision system according to an embodiment of the present invention.

FIG. 1 is a system view that illustrates a configuration of a content provision system of the present embodiment.

As illustrated in FIG. 1, in the content provision system of the present embodiment, a head-mounted display (HMD: Head Mounted Display) 200 is used in order to provide binocular stereoscopic content which is related to a book 300 to a user 400 when the user 400 is viewing the book. An HMD 200 is configured such that images that are captured by cameras 210 which are arranged at positions corresponding to each eye of the wearer (the user 400) are displayed, and functions as a so-called see-through HMD. Accordingly, even in a state in which the HMD 200 is being worn, the user 400 can read the book 300.

Note that when viewing the book 300 in the present embodiment, content that can provide a three-dimensional visual and auditory experience to the user 400 via the HMD 200 so as to enhance the general user experience which is based on two-dimensional images printed on the book is presented. Accordingly, the HMD 200 has a display apparatus 220 (not shown) so as to display respectively different images for each of the left eye and the right eye of the user, in other words images that are in a relationship for which there is a disparity, and a method that presents the user with a stereoscopic effect by binocular stereopsis according to this display aspect is assumed to be employed. However, the HMD 200 need not necessarily be of a configuration capable of binocular stereopsis to provide a user experience that enhances the information visually obtained from the book by general reading. For example, configuration may be taken such that the HMD presents the same image to both eyes in cases such as when configuring content such that a stereoscopic effect by a motion disparity that is based on movement of a viewpoint is presented.

Also, in the present embodiment, a see-through HMD 200 is employed in order to make it easy for the user to understand that the start of content provision is controlled based on the book 300 being viewed. This is to effectively dramatize an introduction into a user experience that is enhanced by the provided content in relation to a reading experience for the book 300 which is a real object that the user 400 holds in their hands. Dramatization is realized by transitioning, while switching from a state in which the images captured by the cameras 210 are being displayed on the display apparatus 220 to a display of images in which additional image elements are superimposed in a region corresponding to the book 300 on the images, such that ultimately only images corresponding to provision content are displayed (visual information of the outside world is blocked). In the present embodiment, the HMD 200 which uses captured images is used as a see-through type content presentation apparatus, but an HUD (Heads-Up-Display) may also be used. However, in order to present a more immersive experience to the user in accordance with the provision content, it is advantageous to use an HMD 200 that can switch whether or not to present a captured image, since it is capable of blocking outside world visual information.

Also to present a highly immersive experience, sensors 230 (not shown) are integrated in the HMD 200. The sensors 230 may include a direction sensor, an acceleration sensor, a gyro sensor, or the like, for example, in order to detect (so-called head tracking) a posture including a line of sight direction (basically the direction in which the face of the user 400 is facing) and movement (position) of the user 400 wearing the HMD 200. In order to exactly detect the line of sight direction of the user 400, in other words the direction in which the user 400 is gazing, the sensors 230 may have a configuration for detecting a position of a pupil, a reflection on a cornea, or the like. Also, the cameras 210 may function as some of the sensors 230, and in such a case, they may be configured so as to be able to detect movement of the head of the user 400 by detecting an optical flow of images consecutively captured by the cameras 210 or a marker arranged externally.

Information of the line of sight direction detected by the sensors 230 is considered when rendering display images corresponding to binocular stereoscopic content in the PC 100. Such information may also be considered in the expression of sound image movement for audio content that is played by a speaker 240. Information of the line of sight direction may be obtained by analysis/computation on output of the sensors 230 by a converter (not shown) provided in the HMD 200, for example, and may be obtained by analysis/computation in the PC 100 on output of the sensors 230.

Note that detection of a line of sight direction or a head position of the user 400 in accordance with the HMD 200 is explained in the present embodiment as something that is performed using the sensors 230 which are provided in the HMD 200 itself, but it can be easily understood that implementations of the present invention are not limited thereto. For example, it goes without saying that detection of the aforementioned information may be performed by detecting markers attached to the HMD 200 by images captured by an external camera arranged in an environment in which the HMD 200 is used. Also, in the present embodiment, as will be described later, images captured by the cameras 210 are explained as being used to recognize the book 300 itself, and pages and images of the book 300 that the user 400 is viewing, but these images used for detection may be images outputted from another camera in the usage environment or composite images.

The PC 100 performs generation of display images to be displayed to the display apparatus 220 that the HMD 200 comprises and performs display control. In the present embodiment, the PC 100 recognizes the book 300, and in accordance with output of the sensors 230, renders binocular stereoscopic content according to the page being viewed in the book 300 in real time, and causes the display apparatus 220 to display the content. With such a configuration, presentation to the user 400 of binocular stereoscopic content corresponding to a page that is being viewed is performed.

In the present embodiment, the PC 100 is explained as being configured separately from the HMD 200, but implementations of the present invention are not limited thereto. In other words, the HMD 200 and the PC 100 may be integrated, and it goes without saying that recognition of the book and rendering and display control of display images may be performed in the HMD 200 on its own.

Also, it is explained that in the content provision system of the present embodiment, the HMD 200, in which presentation of binocular stereoscopic content is performed so as to surround the eyes of the user 400, is used in order to enhance a feeling of immersion. However, for presentation of binocular stereoscopic content, another apparatus capable of implementing binocular stereopsis by providing images in a relationship in which there is a disparity to each of the left and right eyes of the user 400 may be used.

<Book>

Here, explanation is given of the book 300 which is a target of content provision in the content provision system of the present embodiment.

In the present embodiment, the book is assumed to be a publication for which an actual object physically exists (rather than an electronic medium) and which is constituted by pages on which images corresponding to a given story (it may also include text) are printed, such as so-called comic book or a picture book. The book may be configured by paper media, for example, and it is assumed to be a typical physical book (real object) provided for reading that allows a person who views it to grasp the details of the aforementioned story on its own without the use of the content provision system of the present embodiment.

More specifically, in the content provision system of the present embodiment, in order to provide a user experience that is different to a general experience of reading a book, the book is explained as something that is tangible media for which, when attempting to grasp the details of the story, the action of turning pages is necessary, and it is not electronic media. Specifically, rather than making electronic media that provides a general reading experience via a display apparatus such as an electronic book reader be a trigger, physical media, such as paper media, that provides a general reading experience without intervention of a display apparatus is purposely made to be a trigger. This is to provide an (enhanced) user experience that is of different characteristics when viewing the same media through a display apparatus such as an HMD. However, it should be easily understood that in implementations of the present invention it is not necessary to exclude electronic media as the book that is the trigger of the content provision.

<Configuration of PC 100>

Figure 2:
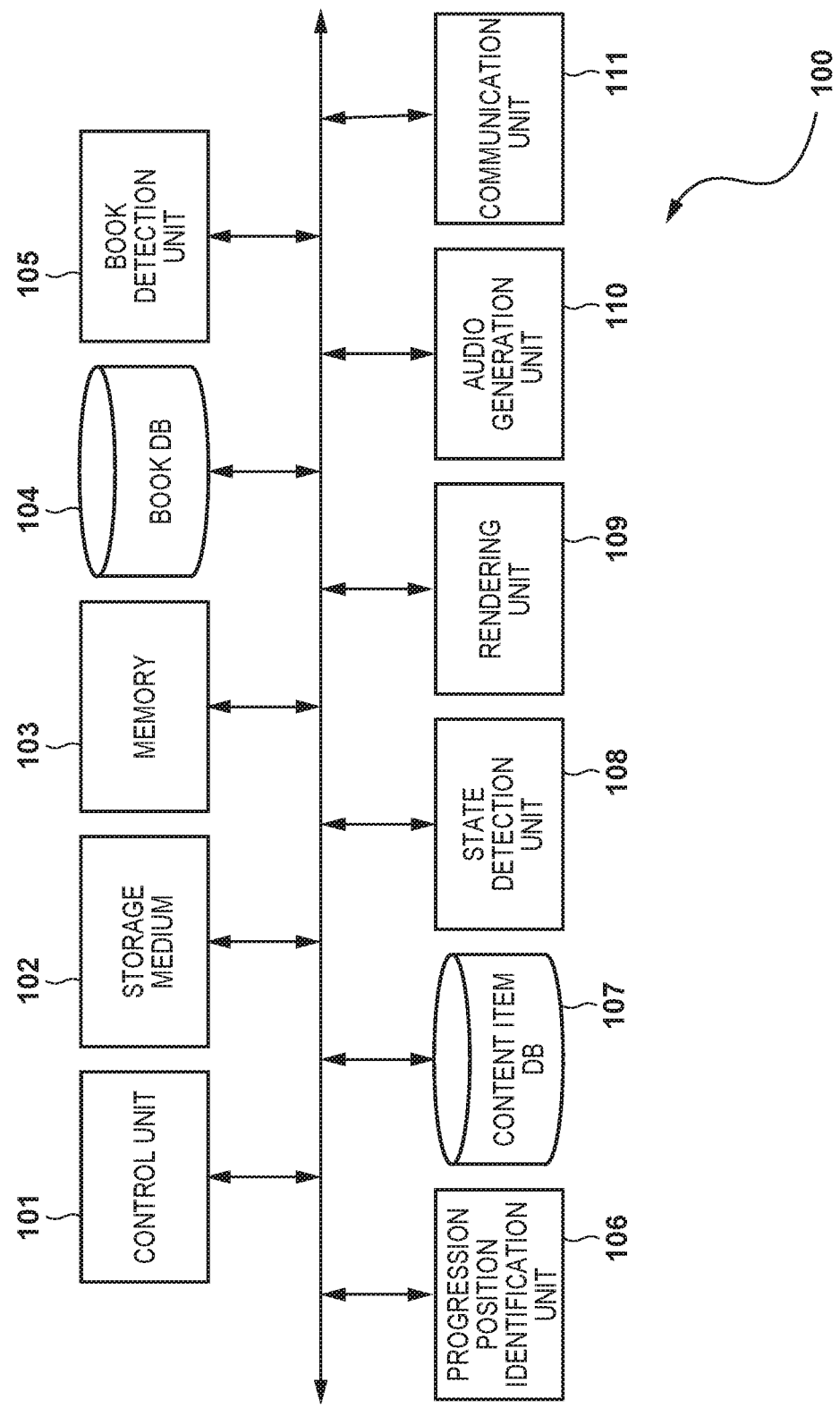
FIG. 2 is a block diagram that illustrates a functional configuration of a PC 100 according to the embodiment of the present invention.

FIG. 2 is a block diagram that illustrates a functional configuration of the PC 100 according to an embodiment of the present invention.

A control unit 101 is, for example, a CPU, and controls operation of each block that the PC 100 has. The control unit 101 controls operation of each block by reading an operation program of the respective block which is stored in a storage medium 102, loading the program in to a memory 103, and executing the program.

The storage medium 102 is a non-volatile recording apparatus including an integrated rewritable ROM that the PC 100 comprises, for example, an HDD, or an optical disk that can be read via an optical drive. The storage medium 102 records not only operation programs of each block but also information such as various parameters that are necessary in the operation of each block. The memory 103 is a volatile memory, for example, and is used not only as a loading region for operation programs of each block, but also as a storage region for temporarily storing intermediate data outputted in the operation programs of each block.

A book DB 104 is a database for managing information of books for which corresponding binocular stereoscopic content can be provided in the content provision system of the present embodiment. In the book DB 104, information (book information) that is managed for each book includes an image of at least a portion of the pages of the book or an image of a portion within a page. Such images are used to, based on images (captured images) that are captured by the cameras 210, determine which book the book 300 being viewed corresponds to or whether it corresponds to a book that is registered in the book DB 104, and discriminate an image of a portion such as a page in a book or a panel or an illustration in a comic book. Also, for a story of the corresponding book, information of a progression stage in the story is associated with each of the images managed in the book DB 104.

Hereinafter, for simplicity, explanation will be given having images accumulated in the book DB 104 in the content provision system of the present embodiment be images corresponding to comic book panels (hereinafter, panel images), and books for which binocular stereoscopic content provision is possible be comic books. Note that determination as to what the book is may be performed with a panel image, but it is assumed that in the content provision system of the present embodiment, considering optimization, it is performed by recognition of, for example, a cover image, an additional character string in a page, or a shape pattern such as a bar code. Also, determination as to what the book is may be performed based on operation input from the user.

A book detection unit 105, based on a captured image, performs processing for detecting whether or not a book that is recorded in the book DB 104 is currently being viewed. For example, the book detection unit 105, by performing, in a case where an image that is predicted to be a front cover of the book 300 is included in a captured image, a comparison of an image after extracting a corresponding region and applying predetermined transformation processing for comparison and a group of cover images of books managed in the book DB 104, determines whether or not the book 300 is a book for which it is possible to provide binocular stereoscopic content, and in the case where it is a book for which provision is possible, determines what book it is.

A progression position identification unit 106, based on an image of a region corresponding to the book 300 included in the captured image, identifies what stage (progression position) in the story according to the book that the user 400 is currently viewing has reached. In the content provision system of the present embodiment, in the case where a panel image that is registered in the book DB 104 is detected for the book 300 that the user 400 is viewing, the progression position is identified based on information of the progression stage in the story associated with that panel image.

In recent years, an aspect of provision called "media mixing", in which a plurality of types of books (and video works) are published regarding a work that corresponds to a story, for example, is becoming more common. More specifically, regarding works that correspond to the same story, there is no limitation to a single type of comic book, and books of various aspects such as a comic book of a sub-story or a derivative work based on the same progression in the story, comic books in which a panel is configured by an image of a frame in an animation of the same work, a magazine (a comic book magazine or the like) published prior to the making of an independent book, and a novel with illustrations may be provided. Considering this background information about publishing and the cost of creating binocular stereoscopic content, performing binocular stereoscopic content association for a progression position in a story has an advantage in that it is possible to provide common binocular stereoscopic content when viewing each page or panel corresponding to the same progression position for a plurality of types of books whose pictures, page configurations, and depiction orders (the order in which the temporal sequence of the story changes in a dramatization in the putting together of the book) may differ from each other.

A content item DB 107 manages corresponding binocular stereoscopic contents for each book that is being managed in the book DB 104. Binocular stereoscopic content corresponding to each book is content whose progression is controlled based on the story of the book, and at least one type of binocular stereoscopic content is prepared for a book. For example, in the case where the book is a comic book as exemplified in the present embodiment, for each of a plurality of panel images that are registered in advance, binocular stereoscopic content which progresses similarly to a story corresponding to a panel image (a story expressed in the panel image and/or a story up until reaching the panel image) is managed. Binocular stereoscopic content managed for each of a plurality of panel images of one book may express respectively different parts (ranges) in a story, and at least a portion of ranges in the story that are expressed may be common.

Also, the binocular stereoscopic content managed in the content item DB 107 may be dynamically modified with respect to factors other than the position and direction (line of sight direction) of the viewpoint for which rendering is performed. Meanwhile, since an enhanced user experience according to reading is to be provided, it is advantageous that basically a scene switch or the motion and speech/behavior of a character be determined in advance in accordance with the story of the book. However, in implementations of the present invention, there is no limitation to this if a degree of association between the book and the binocular stereoscopic content that is provided is based on the details recorded in the book that are the trigger for starting the provision.

A state detection unit 108 detects a posture, position, or the like of the HMD 200 and a current state of the HMD 200 at a predetermined time interval. The state detection unit 108 receives output of the cameras 210 or the sensors 230 via a communication unit 111 which will be described later, detects the current state of the HMD 200, and stores it in the memory 103 as state information. In the present embodiment, the state detection unit 108 in the PC 100 is explained as something that performs analysis and computation corresponding to identification of the posture and position of the HMD 200. However, as described above, a configuration may be taken such that the state detection unit 108 detects a state by computation results, which are the result of performing these computations in the HMD 200, being received in the PC 100, and a configuration may be taken such that the state detection unit 108 detects a state by output from an apparatus other than the HMD 200 or a result of computation on an apparatus other than the HMD 200 being received by the PC 100.

A rendering unit 109, based on state information stored in the memory 103 by the state detection unit 108, generates display images for the left eye and for the right eye which the display apparatus 220 of the HMD 200 is to be caused to display. In the content provision system of the present embodiment, the configuration of a display image differs before/after the start of binocular stereoscopic content corresponding to the book 300. Prior to the start of binocular stereoscopic content, captured images that were captured by the cameras 210 are displayed on the display apparatus 220 so that the user 400 can experience reading of the book 300. In the content provision system of the present embodiment, so that a transition to binocular stereoscopic content of a display image during viewing of the book 300 can be dramatized without a sense of unnaturalness, the output of the cameras 210 in the HMD 200 is not directly displayed (camera through) on the display apparatus 220 for the display image; rather, the captured images are first outputted to the PC 100, and something that is then formed as a display image by the rendering unit 109 is displayed on the display apparatus 220. Specifically, in order to dramatize an experience in which the user enters a world in the story recited on the book 300 that the user is viewing, captured images are outputted as display images via the PC 100 so as to enable superimposition of elements corresponding to binocular stereoscopic content.

Regarding transition from viewing the book 300 to binocular stereoscopic content, for example, dramatization may be such that, after a panel image that is the trigger for starting provision is presented identifiably by a predetermined superimposition display so that the user 400 can easily recognize and focus on the start of the content, transition is made to watching of the binocular stereoscopic content while enlarging the image such that the panel image surrounds the field of view of the user 400. Note that the aspect of dramatization corresponding the start of content provision will be explained in detail with examples in the later described content provision processing.

To enhance the feeling of immersion into the world of the story after starting the binocular stereoscopic content, the rendering unit 109, without using a captured image, configures one display image by linking screens for the left eye and for the right eye that were rendered based on information of corresponding binocular stereoscopic content that is managed in the content item DB 107. The screens for the left eye and for the right eye are generated by rendering a three-dimensional scene that is to be rendered with defined viewpoint positions that are separated by an amount corresponding to an eye separation using a position defined in the scene as a reference based on the state information. Also, it is possible to cause the user 400 to be immersed in the content by the control unit 101 controlling the rendering unit 109 so as to render a scene after setting the viewpoint, which is a position and a line of sight direction, according to motion of the head of the user 400, based on the state information.

An audio generation unit 110 generates audio content to be presented via the speaker 240 to the left ear and the right ear of the user 400 such that the user 400 is able to localize a sound image when the binocular stereoscopic content is provided. In the content provision system of the present embodiment, since the provided binocular stereoscopic content is content whose progression is determined in advance in accordance with the story of the book 300, the audio generation unit 110 generates audio content that is prepared for that content by processing in accordance with a positional relationship between a source of generation of audio content defined in advance and a viewpoint position decided depending on the state information.

The communication unit 111 is an interface for communication with external devices that the PC 100 comprises. In the present embodiment, the communication unit 111 has an interface for outputting which performs output of display screens to the display apparatus 220 of the HMD 200 and output of audio signals to the speaker 240, and an interface for inputting which receives captured images that were captured by the cameras 210 and sensing output from the sensors 230 as input. Note that in the present embodiment, the PC 100 and the HMD 200 are explained as being connected by wire, but the PC 100 and the HMD 200 may be connected wirelessly using a predetermined communication technique, and may be connected through another apparatus.

Also, in the present embodiment, the PC 100 is explained as comprising the book DB 104 and the content item DB 107, but these databases do not necessarily have to be integrated as configuration elements of the PC 100. Specifically, information managed in the book DB 104 and the content item DB 107 may be information that is necessary upon detection of the book 300 or provision of the binocular stereoscopic content to the user 400, and therefore the book DB 104 and the content item DB 107 may be external apparatuses connected via the communication unit 111. In such a case, the book detection unit 105, the progression position identification unit 106, the rendering unit 109, and the audio generation unit 110 may be configured to make requests for necessary information to these databases via the communication unit 111 at a time of service provision to the user 400.

<Content Provision Processing>

Figure 3:
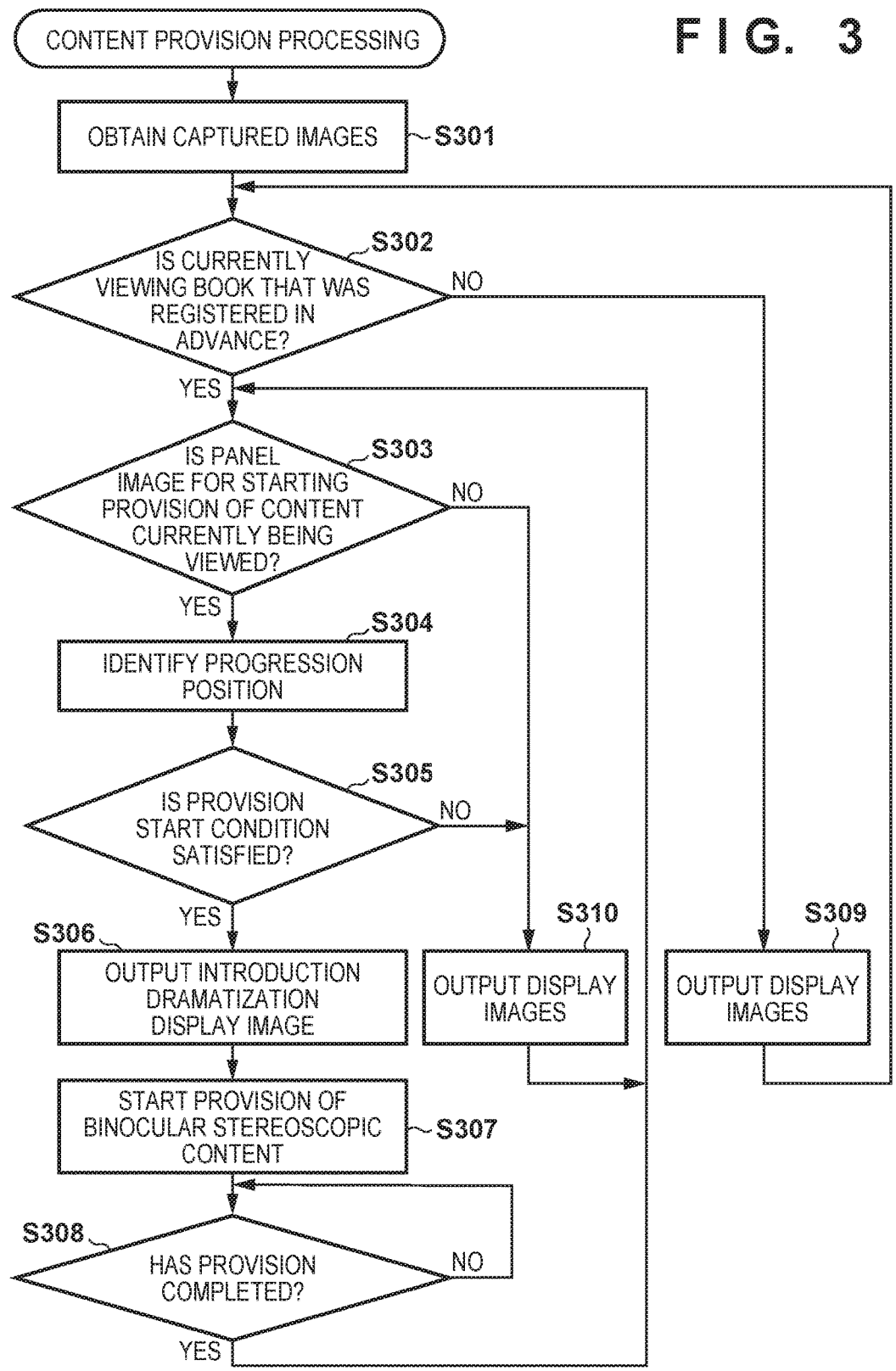
FIG. 3 is a flowchart that exemplifies content provision processing that is executed on the PC 100 according to the embodiment of the present invention.

Regarding content provision processing that is executed by the PC 100 of the present embodiment having this kind of configuration, specific processing will be explained using the flowchart of FIG. 3. The processing corresponding to this flowchart can be implemented by the control unit 101 reading a corresponding processing program stored in the storage medium 102, for example, loading it into the memory 103, and executing it. Note that this content provision processing is explained as something that is started when, for example, a connection between the PC 100 and the HMD 200 is established, and an application activation instruction corresponding to this content provision processing is made.

In step S301, the control unit 101 starts obtainment from the HMD 200 via the communication unit 111 of captured images for the left eye and for the right eye that were captured by the cameras 210. The obtained captured images are stored in the memory 103.

In step S302, the book detection unit 105 determines whether or not the book that is currently being viewed is a book that was registered in advance. In other words, the book detection unit 105 determines whether or not an image (book image) that indicates a book is included in the captured image, and information for identifying the book obtained from the book image indicates a book that was registered in advance. In the determination of this step, the book detection unit 105 obtains from the book DB 104 information for identifying each of the books that are registered in advance and identifies which book is being viewed by comparing that information against the information for identifying the book obtained from the book image. In a case where the book detection unit 105 determines that the book that is currently being viewed is a book that was registered in advance, the book detection unit 105 stores information (target book ID) that identifies that book (target book) in the memory 103, and moves the processing to step S303. Also, in a case where the book detection unit 105 determines that the book that is currently being viewed is not a book that was registered in advance, the book detection unit 105 moves the processing to step S309.

In step S303, the progression position identification unit 106 determines whether or not a panel image that is currently being viewed by the user 400 is a panel image that was registered in advance as something that starts provision of binocular stereoscopic content. The progression position identification unit 106 obtains book information (target book information) being managed in the book DB 104 in association with the target book ID, and performs a determination as to whether or not a panel image that is predicted to be currently being viewed out of the book images matches a panel image included in that book information. Note that the panel image that is predicted to be currently being viewed may be something that is predicted by any kind of method, such as a panel image that is arranged at a central position in a captured image, for example, or a panel image that is arranged at a gaze point in a case where a gaze point in the captured image can be identified, or the like. The progression position identification unit 106 moves the processing to step S304 in a case where the panel image that is currently being viewed is determined to be a panel image that was registered in advance as something that starts provision of binocular stereoscopic content, and moves the processing to step S310 in a case where the panel image that is currently being viewed is determined not to be a panel image that was registered in advance.

In step S304, the progression position identification unit 106 identifies the progression position in the story corresponding to the panel image currently being viewed based on information of a progression stage associated with the panel image for the target book information. Note that configuration may be taken such that the processing of this step is not executed while the same panel image is determined to be currently being viewed in step S303 after identifying the progression position for a single panel image.

In step S305, the control unit 101 determines whether or not a condition for starting binocular stereoscopic content corresponding to the identified progression position is satisfied. The condition for starting the binocular stereoscopic content may be defined based on the determination that the details of the target panel image have been grasped by the user 400 such as when the time over which the target panel image is viewed has reached a time period that is defined in advance as being necessary to read the panel image or grasp its details, or when the viewing target of the user 400 changes from the target panel image to the next panel image, or the like. The control unit 101 moves the processing to step S306 in a case where it determines that the start condition is satisfied, and moves the processing to step S310 in a case where it determines that the start condition has not be satisfied.

In step S306, the rendering unit 109, under the control of the control unit 101, generates and outputs a display image to cause the display apparatus 220 to display such that display control corresponding to an introduction dramatization prior to starting to provide the binocular stereoscopic content corresponding to the identified progression position is performed. It is advantageous to, in order to make clear in the case of performing binocular stereoscopic content provision based on the identified panel image that provision to the user 400 who has been reading the book 300 thus far will be started, perform an introduction dramatization in which the panel image that is the trigger for starting the provision is presented identifiably as described above. Accordingly, in this step, the rendering unit 109 renders according to the viewpoints for each of the left eye and the right eye while causing an element corresponding to the introduction dramatization to transition successively, and performs processing for configuring display images in which it is superimposed onto each captured image.

<Aspect of Introduction Dramatization Prior to Start of Content Provision>

As the introduction dramatization aspect, an aspect in which, after the panel image that is the trigger for starting provision is configured identifiably by a predetermined superimposition display, binocular stereoscopic content is transitioned into while the panel image is enlarged so as to fill up the field of view of the user 400 is described above, but other examples or more specific examples of forms of introduction dramatization performed before starting to provide the binocular stereoscopic content will be described below.

As one aspect of introduction dramatization, a corresponding panel image of the book 300 configured in a page that is printed in monochrome may be replaced with a color panel image and displayed. Alternatively, display may be performed in which the panel image is replaced with an animation that indicates the details expressed in the panel image or the details corresponding to the opening portion of the binocular stereoscopic content that is scheduled to be provided, for example.

Also, in another aspect, an element that is rendered such that a scene corresponding to the panel image, for example, is perceived three-dimensionally, rather than two-dimensionally, on the book 300 as with a so-called pop-up picture book may be displayed to be superimposed as with so-called AR (Augmented Reality) content. Also, in another aspect, irrespective of the target panel image, an element that is rendered such that a character that appears in the story of the book 300 is three-dimensionally perceived to be present on the page of the book 300 is displayed to be superimposed.

Figure 4:
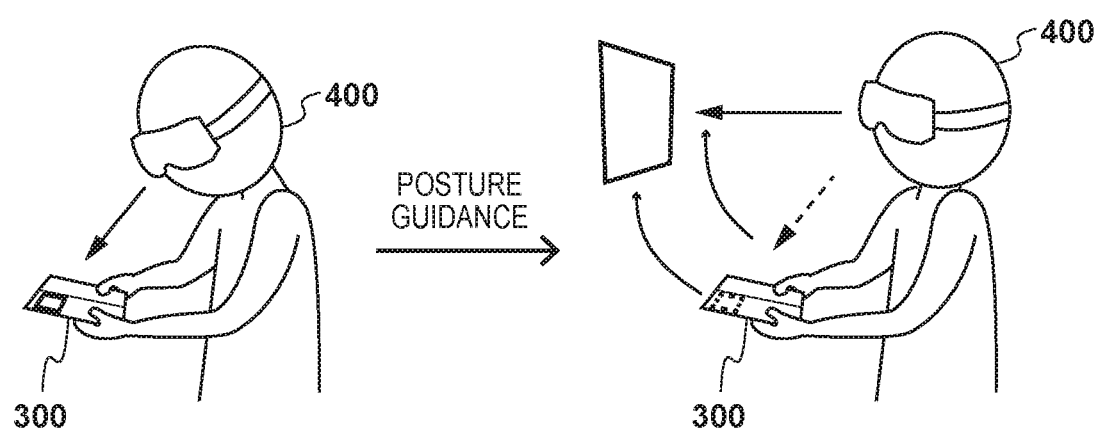
FIG. 4 is a view for explaining an introduction dramatization aspect prior to starting content provision according to the embodiment of the present invention.

In yet another aspect, an introduction dramatization may be performed so as to prompt the user 400 to change their posture. Typically, one's posture for reading, such as tilting one's head forward, depends on the user. From this perspective, the direction in which the user 400 is able to watch may be limited in a case where provision of binocular stereoscopic content is started from a reference line of sight direction (for example, a direction for which the target panel image is rendered or a direction of gaze at a character according to a story progression) defined for watching the binocular stereoscopic content. Specifically, in a case of starting to watch binocular stereoscopic content from a reference line of sight direction in a state in which one head is tilted forward, for example, while it is possible for the user 400 to watch an upper part with respect to the reference line of sight direction in the scene corresponding to the content by tilting their head back, it may be difficult to watch a lower part due to restriction in the movement of the head. Accordingly, it is possible to perform an introduction dramatization that causes the replaced panel image to move, as in FIG. 4, so as to guide the posture, for example the gaze, of the user 400 to a posture suited to a reference line of sight direction based on state information obtained for the HMD 200 when starting the introduction dramatization.

Further, in a case where the content provision system is a system that provides binocular stereoscopic contents whose presentation details change in accordance with movement in an environment having a predetermined width in which the user 400 can walk, introduction dramatization may be performed such that, for example, an image of a page in the book 300 being viewed is displayed at the actual size of the user 400, and binocular stereoscopic content in accordance with the story is provided when the user 400 themself walks into the panel image.

Additionally, configuration may be taken such that provision of binocular stereoscopic content is started by prompting a predetermined gesture by the user 400 or operation input corresponding to a predetermined operation input device that is provided on the HMD 200.

After completion of the introduction dramatization, the rendering unit 109, in step S307, under the control of the control unit 101, starts provision of the binocular stereoscopic content corresponding to the progression position identified. Provision of binocular stereoscopic content is performed by information corresponding to control of the progression of the binocular stereoscopic content which defined in advance for a progression position as described above being obtained from the content item DB 107, and based on computations made by the control unit 101 in accordance with the control of the progression, the rendering unit 109 successively rendering display images to be presented on the display apparatus 220, and outputting them. Rendering of display images is performed respectively for the viewpoints for the left eye and for the right eye for which the position and line of sight direction is changed based on the state information such that the details that are rendered change in accordance with movement of the head of the user 400, similarly to the introduction dramatization. Note that when providing binocular stereoscopic content, the audio generation unit 110 is also assumed to generate and output, based on information corresponding to control of the progression of the binocular stereoscopic content and the state information, an audio signal to be played back in the speaker 240.

In step S308, the control unit 101 determines whether or not provision of binocular stereoscopic content corresponding to the identified progression position has completed. The control unit 101 returns the processing to step S303 in a case where it determines that provision of binocular stereoscopic content corresponding to the identified progression position has completed, and repeats the processing of this step in the case where it determines that it has not completed.

Meanwhile, in a case where it is determined in step S302 that the book currently being viewed is not a book that was registered in advance, the rendering unit 109, in step S309, under the control unit 101, generates display images in which the captured images outputted from the cameras 210 for the left eye and for the right eye are arranged in regions for the left eye and for the right eye respectively, and outputs them to the display apparatus 220. Similarly, in a case where it is determined in step S303 that the panel image that is currently being viewed is not a panel image that was registered for starting to provide binocular stereoscopic content, and in a case where it is determined in step S305 that the condition for starting content provision has not been satisfied, the rendering unit 109, in step S310, under the control unit 101 generates display images in which the captured images outputted from the cameras 210 for the left eye and for the right eye are arranged in regions for the left eye and for the right eye respectively, and outputs them to the display apparatus 220. Specifically, display images based on the output of the cameras 210 are presented on the display apparatus 220 so as to provide the user 400 with visual information that is equivalent to a state in which the HMD 200 is not being worn even though the HMD 200 is being worn.

With such a configuration, in the content provision system of the present embodiment, at a time of the act of reading a published book, it is possible to appropriately perform a presentation to the user of binocular stereoscopic content related to the book in correspondence with the progression position corresponding to the state of progression of the reading.

<Examples of Provision of Binocular Stereoscopic Content>

Next, aspects of providing binocular stereoscopic content which is provided in the content provision system of the present embodiment will be explained with several examples. As described above, basically progression is controlled based on the story recorded in the book for the binocular stereoscopic content which is presented to the user 400 who is the reader of the book 300 when a start condition (detection of a panel image that was registered in advance) is satisfied. Specifically, the progression of the binocular stereoscopic content that is presented is based on the story grasped from the details of the book 300 that the user 400 had been viewing up until the panel image where the start condition was satisfied.

<Content Configuration Example>

Hereinafter, configurations of the binocular stereoscopic content that is provided in correspondence with the book are exemplified.

(1) "Be-the-Character" Experience Type Content

At least a variety of characters appear in books, not limited to comic books. Ordinarily, in reading a book, a reader may sometimes grasp the details by self-projecting as these characters, and envisioning a situation in which the character is placed (in particular, a book in which there are few illustrations, and depiction of the situation is made in the text, such as a novel). In the system of the present embodiment, so as to be able to experience a situation in which such a character is placed in the story realistically, binocular stereoscopic content that is configured so as to present a story progression by providing a field of vision of a particular character may be provided. A character whose field of vision is provided may be a hero or a main character involved closely in the progression of the story, and configuration may be taken such that for a story it is possible to select whether to have a "be-the-character" experience for any character depending on the taste of the reader, for example. Also, since the characters that are mainly depicted in the panels in a comic book or the like and the characters whose perspective is described changes, the progression may be controlled so that the character for which the "be-the-character" experience is performed changes as necessary in correspondence with the details depicted in the panels up until the panel image that is the trigger of the start of provision.

(2) Spectator Type Content

The above described "be-the-character" experience type content is something that makes it possible for the user 400 to have a "be-the-character" experience for the story as a character by actually providing a field of vision of a character in the story to the user 400. Meanwhile, with a "be-the-character" experience as a character, it may become difficult to watch the character whose field of vision is assigned to oneself in the content. Specifically, in a case where binocular stereoscopic content is provided by the field of vision of a hero character, for example, being presented to the display apparatus 220, the user 400 cannot view the hero character in the watching.

Accordingly, configuration may be taken such that for example, depending on the book, content by which it is possible to spectate a character is provided for a viewpoint position arranged in a three-dimensional scene in which the story is unfolded, rather than the field of vision of the character. Specifically, while the story expressed in the book is depicted for a viewpoint that is defined in advance in the dramatization, in spectator-type content, it is possible to additionally present to the user what kind of action another character took in a scope that was not depicted.

For example, for books whose details are of so-called suspense or horror genres, configuring the binocular stereoscopic content such that it is possible to focus on the movements in the story of all characters or a identified character at a viewpoint from a reference position arranged discretely such as a monitoring camera or a shadow, rather than the viewpoint of a character, may result in a more suitable dramatization.

A viewpoint at which it is possible to spectate typically is included in an area where it is possible to watch more information than a viewpoint set for a character, and because the area and detail of the three-dimensional scene that a designer should construct upon provision of binocular stereoscopic content could become huge, it is advantageous to restrict, for a spectator viewpoint, the range of the line of sight directions that can be watched by the user 400 moving their head. From this perspective, a dramatization, in which restriction of a range of directions that the line of sight direction can be is performed in advance by making typical equipment, such as a monitoring camera in particular, be the viewpoint corresponding to the content provision, is suitable. Specifically, a data amount needed to be generated or downloaded corresponding to the provision of binocular stereoscopic content can be reduced by limiting the provision viewpoint.

Note that the reference position for each viewpoint arranged discretely may be configured such that, for example, it can be selected as appropriate by the user 400, to make it possible for the user 400 to watch the story from a plurality of viewpoint positions thereby. Here, since a viewpoint change is allowed within a range that is defined in advance in accordance with movement of the head of the user 400 and a rotation of the line of sight direction at each position, the expression "reference position" for a selectable viewpoint indicates reference coordinates for defining that range.

Also, performing a viewpoint change between reference positions arranged discretely in this way may bring about an obstacle to suitable watching such as when a sharp change occurs and consequently the user loses their sense of direction such as when displayed details of the binocular stereoscopic content that are presented to the user are unrelated according to the distance and line of sight directions between the reference positions before/after the change. In order to avoid this kind of situation, configuration may be taken such that a change is performed for a viewpoint change, for example, to a reference position arranged in a positional relationship of a rotational direction from a currently selected reference position, in accordance with a rotation of the head of the user 400.

Figure 5A:
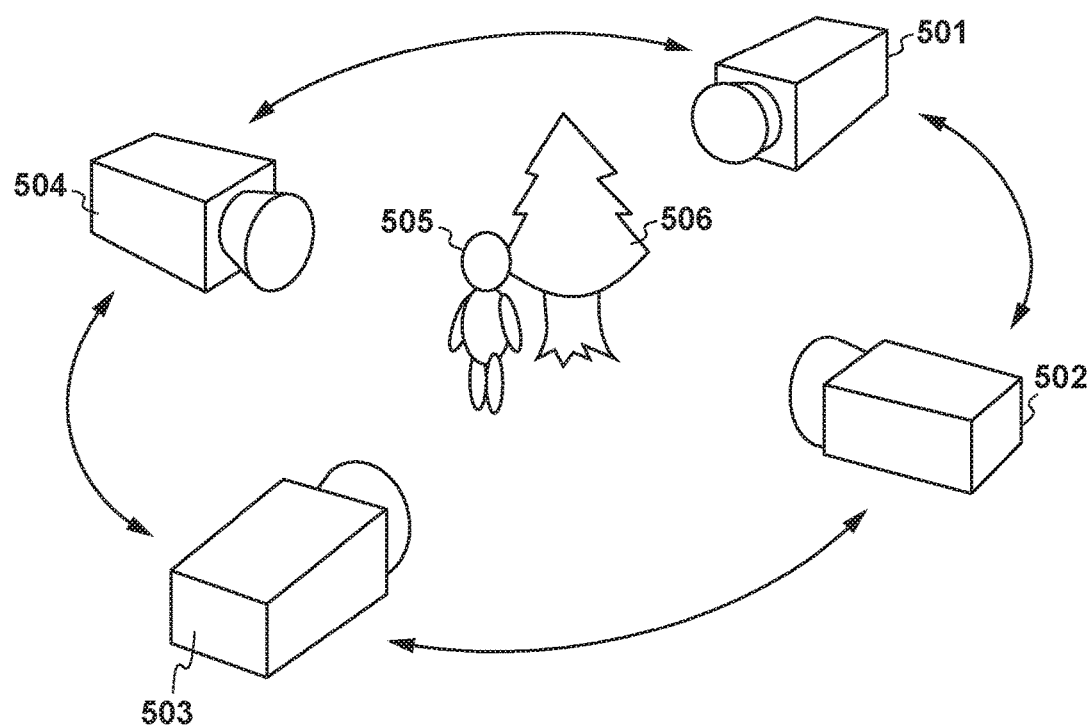
Figure 5B:
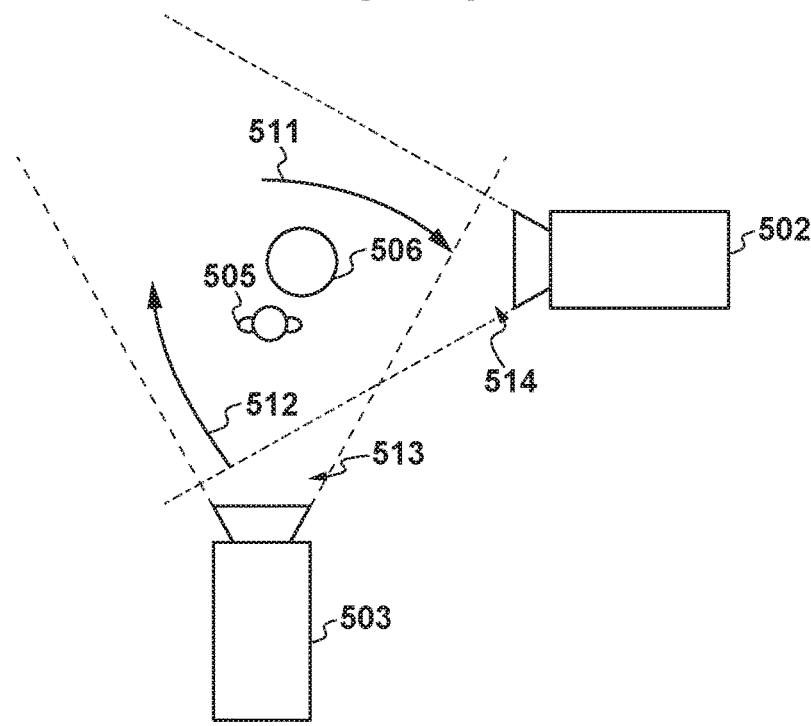

For example, configuration may be taken such that, in a case where four types of viewpoint reference positions are set in a scene in which a character 505 and a tree 506 are arranged in a positional relationship as illustrated in FIG. 5A, if the rotational direction of the head of the user 400 (Yaw direction: rotation where the vertical axis is made to be the rotation axis) is in a clockwise direction, the viewpoint reference position is changed in the order of . . . →viewpoint 503→viewpoint 502→viewpoint 501→viewpoint 504→viewpoint 501→ . . . , and if the rotational direction is in a counterclockwise direction, the viewpoint reference position is changed in the order of . . . →viewpoint 503→viewpoint 504→viewpoint 501→viewpoint 502→viewpoint 503→ . . . . The change in the viewpoint reference position, in a case where a rotation of the line of sight direction is performed in a clockwise direction in accordance with the rotation of the head of the user 400, for example, is based on making it possible to guarantee the continuity of the change in the line of sight direction by causing movement in a rotation (arrow 512) from the left end of a field of view 514 in the horizontal direction that is provided for the next viewpoint 502 after rotation to the right end of field of view 513 (arrow 511 of FIG. 5B) in the horizontal direction that is provided for the viewpoint 503. With such a configuration, it is possible to reduce the occurrence of situations in which the user loses their sense of direction because it is possible to switch to a viewpoint that is present in the rotated line of sight direction while maintaining the relatedness of the watching details.

Also, configuration may be taken so as to, at a time of switching the viewpoint reference position during rotation, make clear that the switching is being performed by generating display images that are arranged so as to separate images rendered for viewpoints before/after the switching for respective eyes, as is illustrated in FIG. 5C, and arranging a head angle in which a display image that is intentionally darkened is caused to be displayed. Specifically, configuration may be taken to cause the user 400 to be conscious of the occurrence of the viewpoint switch by purposely indicating a discontinuity before/after switching the viewpoint reference position.

Figure 5D:
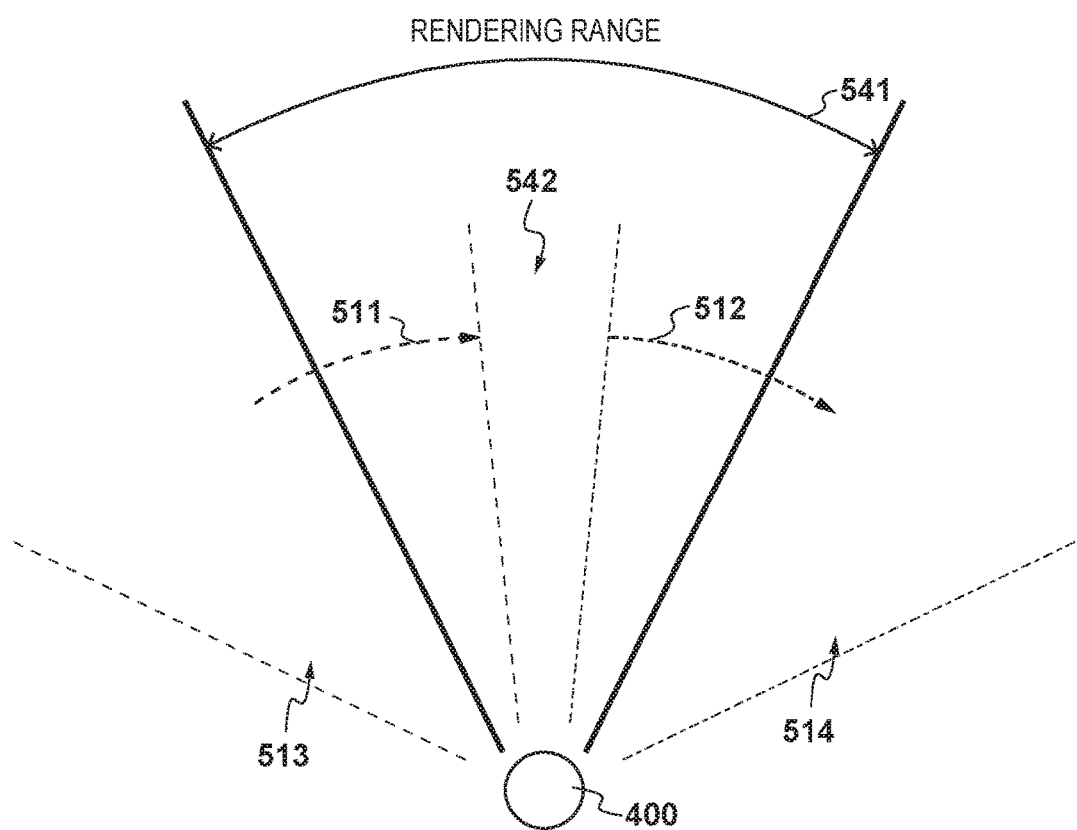

In the example of FIG. 5C, the field of view 513 provided for the viewpoint 503 and the field of view 514 provided for the viewpoint 504 are separated by a black region in a central portion in the display images for each eye, and so it is possible to cause the user 400 to recognize that a viewpoint change will occur. More specifically, as illustrated in FIG. 5D, areas for line of sight directions for rendering the field of view 513 and/or the field of view 514 are defined about the head of the user 400, and in a case where a rendering range 541 which is determined for a line of sight direction of the user 400 as in the figure includes in a region 541 that does not belong to either field of view, a display image for each eye having a black region in a central portion as in FIG. 5C is generated.

Meanwhile, if no particular restriction on the data amount of the binocular stereoscopic content is necessitated, configuration may be taken such that it is possible to freely move in the three-dimensional scene expressed as binocular stereoscopic content, for example, in an environment that allows the user 400 to walk around while wearing the HMD 200. In such a case, since there is the possibility that an event in the story will be overlooked, configuration may be taken to define an importance for grasping the details of an event, for example, and to force an experience of an event by a cut-in for an event having a predetermined importance, whatever position the viewpoint is at in the three-dimensional scene.

Also, there is no need to provide, as the binocular stereoscopic content, an experience of an aspect in which the world that is expressed in the story is entered into. For example, the binocular stereoscopic content may be configured in an aspect in which the details being expressed in the story are expressed as a "performance" on a platform such as a stage or a set on which an appearing character appears as a performer, and the story is spectated from audience seating arranged around that platform.

(3) Provision of Details not Recorded in Book

An example was given above of enhancing a user experience by providing a region that was not depicted among the scenes recorded in the book such that it can be watched by the user upon movement of the head of the user 400 or selection of a particular viewpoint position in the watching of the binocular stereoscopic content. However, binocular stereoscopic content provided to the user 400 by the content provision system is not limited to this, and may be a sentiment of a character or a sub-story that occurs at a place that is different to the place depicted in the book but that is in a world in which the same events as in the story occur, for example. Specifically, the binocular stereoscopic content that is presented may be details that progress for content that is not depicted or recorded in the book and that are related to the story corresponding to the panel image that is the trigger for starting provision.

Figure 6A:
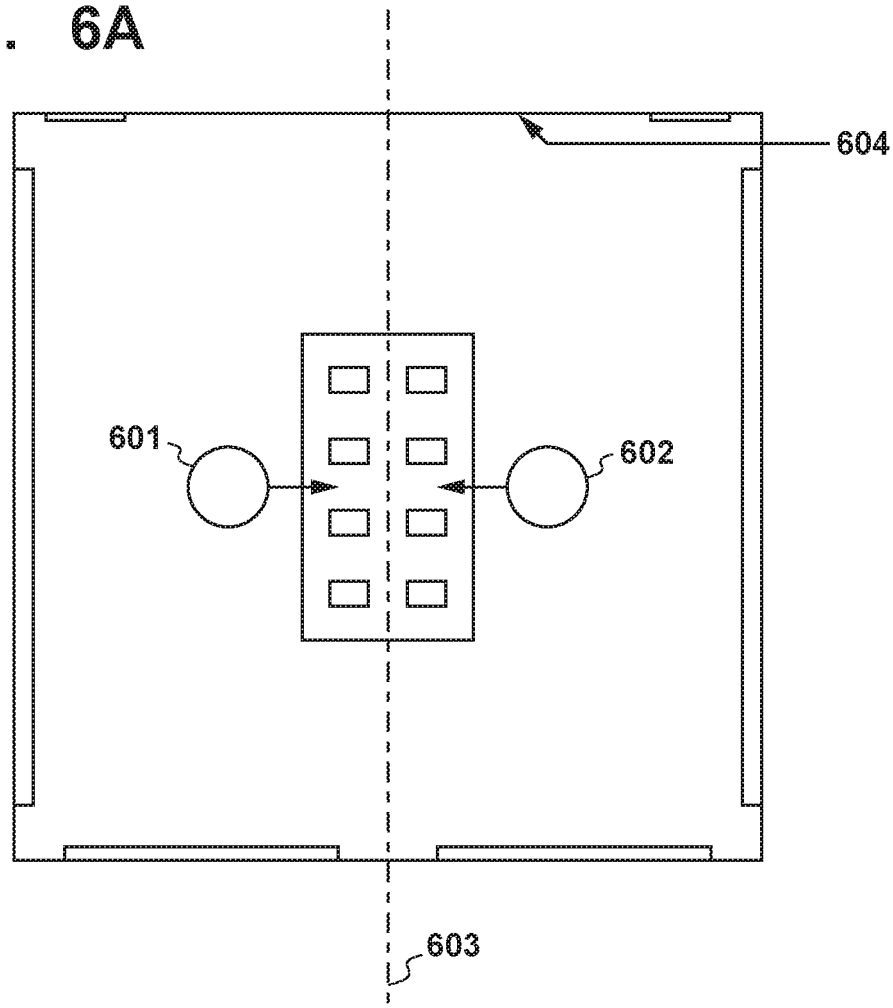
FIG. 6A and FIG. 6B are other views for explaining an example of a configuration of binocular stereoscopic content according to the embodiment of the present invention.
Figure 6B:
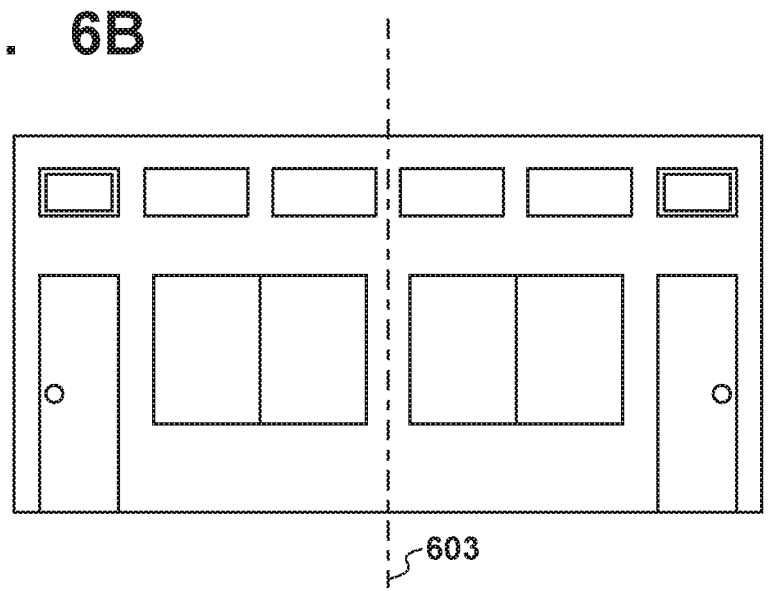

Note that rendering control for switching the viewpoint reference position in spectator-type content was described above, but rendering control for when switching the character whose field of vision is provided in "be-the-character" experience type content may similarly be performed in accordance with an action of rotation of the head of the user 400. For example, in the case of two characters (601 and 602) sitting directly facing each other as illustrated in FIG. 6A, the character whose field of vision is provided may be switched by the user 400 performing an action of looking back. For a scene in which a positional relationship of characters with background objects is arranged symmetrically as in FIG. 6A, the continuity of a texture can be guaranteed in a direction of the head in which the switch is performed particularly in a case of configuring such that a texture of a background object 604 that is present in a lateral direction of each character becomes linearly symmetrical across a boundary line 603 between the characters as in FIG. 6B. Accordingly, it is possible to cause the display image to transition smoothly when switching the viewpoint without purposely presenting a display image that separates rendered images of two viewpoints before/after the switching, as in FIG. 5C, and that would make the user conscious of a discontinuity. Specifically, in the generation of display images that correspond to a viewpoint switch and are presented to each of the eyes, by configuring the display images in images that link rendered images of two viewpoints that correspond to before/after the switch, it is possible to smoothly perform a display transition between viewpoints whose line of sight direction and reference position differ.

As explained above, in accordance with the content providing apparatus of the present embodiment, it is possible to provide an additional user experience when a user views a book provided for reading.

[First Variation]

Incidentally, for a book for which reading has not been completed, when reading the book once again, there are cases in which only a portion of a scene that left a particular impression, for example, is viewed, rather than necessarily viewing from the beginning of the book. Meanwhile, in a case of a presentation where pre-associated binocular stereoscopic content for until a progression position corresponding with a panel image is played, as in the above described embodiment, a difference between supply and demand may occur for provision of the binocular stereoscopic content such as where a part (range) of the story in the content that a user desires to watch is not included, or where conversely the presentation starts from a part (range) that a user does not desire to watch.

Accordingly, a panel image for which the start of provision of binocular stereoscopic content is not defined may be registered in the book DB 104 in order to define a part (range) of a story to be included in the binocular stereoscopic content to be provided, for example. In such a case, the progression position identification unit 106 may accumulate information of progression positions identified for panel images that the book detection unit 105 detected up until a panel image of a progression position for which the start of provision is defined is detected, and the control unit 101, at the time of starting provision, may decide a part (range) of a story to be provided as binocular stereoscopic content based on the information of the progression positions that was accumulated. Also, configuration may be taken such that the user 400 can select whether or not to start provision of the binocular stereoscopic content, and configuration may be taken such that in a case where it is selected to start provision, a part (range) of the binocular stereoscopic content to be played back is decided based on information of the progression position accumulated thus far.

[Second Variation]

In the embodiment and the first variation, the provided binocular stereoscopic content is explained as being decided based on a progression position identified for a panel image being viewed by the progression position identification unit 106. However, the binocular stereoscopic content provided in the content provision system according to the present invention is not limited to being managed in association with the progression position in the story of the book being viewed. For example, in a case where, for a single panel image depicting a scene in which there is motion, provision as binocular stereoscopic content is performed only for details being depicted in the panel image, configuration may be taken such that binocular stereoscopic content associated with the panel image in advance is played back without even identifying the progression position.

[Third Variation]

Above, the book is explained as being a publication that is configured by pages on which images corresponding to a predetermined story are printed, but the book that is the target of the present invention is not limited thereto. Specifically, even if no pattern in which a world of a story is depicted is included on a page, as is in a comic book, and a view of a world is only recited in text, as in a novel, configuration may be taken so as to provide binocular stereoscopic content by detecting such text. In the case of a novel or the like, it is possible that a user will prefer content that is expressed as text, and so the provided binocular stereoscopic content may be content that presents, as an object, a character string corresponding to text in a three-dimensional scene in which only a view of a world such as a landscape is expressed, or content by which text that is read aloud in such a three-dimensional scene can be listened to.

Also, the medium that is the trigger of the content provision is not limited to a book that is published for sale, and may be a promotion item such as a so-called sample book or an advertisement (flyer, poster) published for sales promotion. Because such a promotion item ordinarily is provided in a limited environment such as in a shop, there is the possibility that it will not be an environment in which equipment such as the PC 100 and the HMD 200 as illustrated in FIG. 1 can be used. Accordingly, configuration may be taken such that binocular stereoscopic content is provided by using a mobile communication terminal having an image capturing apparatus and a display apparatus, such as a smartphone, and receiving necessary data via a two-dimensional code or the like, for example, that is affixed to a promotion item. At that time, for example, a simplified HMD (the display is the display apparatus of the mobile communication terminal) of an assembly type which has a resin Fresnel lens and enables binocular stereopsis by incorporating the aforementioned mobile communication terminal may be separately provided, or the promotion item itself may be provided as something that configures a simplified HMD, making it possible for the user to watch the content at a shop. Note that content provision that is based on a promotion item may be something in which a panel image or pattern printed on a promotion item is detected and corresponding story content is played back, or may be something in which identified content prepared for the promotion item is played back.

[Fourth Variation]

The embodiment and the first to third variations are explained as things in which, in a case where an image or character string corresponding to a progression position registered in advance is included in a book being viewed, provision of a single piece of binocular stereoscopic content that is associated with the progression position is started, but implementation of the present invention is not limited thereto. There are cases in which a story recorded in a book is configured such that a temporal sequence goes back and forth such as when details of an event that occurred, for example, are recollected and later described in a dramatization. In such a case, there is a possibility that a scene that is not depicted in accordance with movement of the head of the user 400 will be watched by the user 400. Specifically, a story that is recorded before a page that is being viewed may end up being known in advance, and a suitable reading experience may be hindered. Therefore, control may be performed so as to provide binocular stereoscopic content of a type that is different in accordance with, for example, whether the user 400 has finished reading the book, or the number of times that the book has been viewed.

[Other Embodiments]

The present invention is not limited to the above embodiments and various changes and modifications can be made within the spirit and scope of the present invention. The content providing apparatus according to the present invention can be realized by a program for causing one or more computers to function as the content providing apparatus. The program can be provided/distributed by being recorded on a computer-readable storage medium, or through an electronic communication line. Therefore, to apprise the public of the scope of the present invention, the following claims are made.

The invention claimed is:

1. A non-transitory computer readable storage medium which stores a program for causing a computer to execute:

processing that detects that viewing is being performed for a book that is provided for reading on which details corresponding to a predetermined story are printed and that is registered in advance;

processing that, for a target book for which it is detected that viewing is being performed, identifies a progression position in the viewing in a story corresponding to the book; and processing that starts presentation of binocular stereoscopic content associated with the progression position in the viewing that is identified, wherein a plurality of progression positions, including the progression position in the story corresponding to the book, for each book is registered in advance, in the processing that starts the presentation, a range of the story corresponding to the target book that is presented as the binocular stereoscopic content is decided based on the progression position identified in the processing that identifies the progression position among the plurality of progression positions, and the presentation of the binocular stereoscopic content is started, the program further causes the computer to execute processing that detects a posture of a user viewing the book, a suited posture of the user is defined for viewing the binocular stereoscopic content, and in the processing that starts, if the detected posture of the user is different from the suited posture, a presented position of the binocular stereoscopic content is moved so as to guide the posture of the user to the suited posture.

2. The storage medium according to claim 1, wherein the program further causes the computer to execute processing that obtains a captured image that captured the book being viewed by the user who is a target of presentation of the binocular stereoscopic content, and based on the obtained captured image, the processing that detects and the processing that identifies are performed.

3. The storage medium according to claim 2, wherein the book registered in advance includes a page on which an image indicating details corresponding to a predetermined story is printed, and in the processing that identifies, the progression position in the viewing is identified based on an image of the target book in the captured image.

4. The storage medium according to claim 2, wherein the book registered in advance includes a comic book comprising a page comprising at least one panel, and in the processing that identifies, the progression position in the viewing is identified by recognizing a panel of the target book included in the captured image.

5. The storage medium according to claim 1, wherein the binocular stereoscopic content that is presented in the processing that starts is changed in accordance with a number of times that the same progression position is identified as the progression position in the viewing.

6. The storage medium according to claim 1, wherein the binocular stereoscopic content that is started is content for which progression of presentation details is controlled based on the story corresponding to the target book, and that includes presentation details corresponding to the progression position in the viewing.

7. The storage medium according to claim 6, wherein the program further causes the computer to execute processing that changes a reference position of a viewpoint for which rendering is performed for the binocular stereoscopic content for which progression control is performed based on the story corresponding to the target book.

8. The storage medium according to claim 7, wherein the program further causes the computer to, in accordance with a direction in which the user who is a target of presentation of the binocular stereoscopic content is observing the content, execute processing that controls a line of sight direction for which the content is rendered, wherein in the processing that changes, the reference position of the viewpoint is changed based on a rotation of a direction of the observing.

9. The storage medium according to claim 1, wherein the binocular stereoscopic content that is started is content including details that are not included in details printed on the target book for the story corresponding to the target book.

10. The storage medium according to claim 1, wherein the binocular stereoscopic content that is started is content for providing a "be-the-character" experience of the story corresponding to the target book.

11. The storage medium according to claim 1, wherein in the processing that starts, the range of the story is different in accordance with a combination of identified progression positions among the plurality of progression positions.

12. A content providing apparatus having a central processing unit (CPU), wherein
the CPU is configured to:
detect that viewing is being performed for a book that is provided for reading on which details corresponding to a predetermined story are printed and that is registered in advance;
identify, for a target book for which it is detected that viewing is being performed, a progression position in the viewing in a story corresponding to the book;
start presentation of binocular stereoscopic content associated with the identified progression position in the viewing; and
detect a posture of a user viewing the book,
wherein
a plurality of progression positions, including the progression position in the story corresponding to the book, for each book is registered in advance,
a range of the story corresponding to the target book that is presented as the binocular stereoscopic content is decided based on the progression position identified among the plurality of progression positions, and the presentation of the binocular stereoscopic content is started,
a suited posture of the user is defined for viewing the binocular stereoscopic content, and
if the detected posture of the user is different from the suited posture, a presented position of the binocular stereoscopic content is moved so as to guide the posture of the user to the suited posture.

13. A control method of a content providing apparatus, the method comprising:
detecting that viewing is being performed for a book that is provided for reading on which details corresponding to a predetermined story are printed and that is registered in advance;
identifying, for a target book for which it is detected in the detecting that viewing is being performed, a progression position in the viewing in a story corresponding to the book;
starting presentation of binocular stereoscopic content associated with the progression position in the viewing that is identified in the identifying; and
detecting a posture of a user viewing the book,
wherein
a plurality of progression positions, including the progression position in the story corresponding to the book, for each book registered in advance,
in the starting, a range of the story corresponding to the target book that is presented as the binocular stereoscopic content is decided based on the progression position identified in the identifying among the plurality of progression positions, and the presentation of the binocular stereoscopic content is started,
a suited posture of the user is defined for viewing the binocular stereoscopic content, and
if the detected posture of the user is different from the suited posture, a presented position of the binocular stereoscopic content is moved so as to guide the posture of the user to the suited posture.

* * * * *